United States Patent
Adams et al.

[19]

[11] Patent Number: 6,007,930
[45] Date of Patent: Dec. 28, 1999

[54] METHOD FOR INITIATING A FUEL CELL

[75] Inventors: James A Adams, Ann Arbor; Mark S. Sulek, Warren; George Steve Saloka, Dearborn, all of Mich.

[73] Assignee: Ford Global Technologies, Inc., Dearborn, Mich.

[21] Appl. No.: 09/073,309

[22] Filed: May 6, 1998

[51] Int. Cl.[6] .................................................. H01M 8/00
[52] U.S. Cl. ............................................... 429/13; 429/30
[58] Field of Search .................................. 429/13, 22, 23, 429/30

[56] References Cited

U.S. PATENT DOCUMENTS

| | | | |
|---|---|---|---|
| 4,657,828 | 4/1987 | Tajima | 429/12 |
| 4,820,594 | 4/1989 | Sugita et al. | 429/17 |
| 5,045,414 | 9/1991 | Bushnell et al. | 429/17 |
| 5,346,778 | 9/1994 | Ewan et al. | 429/19 |
| 5,434,016 | 7/1995 | Benz et al. | 429/13 |
| 5,482,790 | 1/1996 | Yamada et al. | 429/9 |
| 5,678,647 | 10/1997 | Wolfe et al. | 180/65.3 |

FOREIGN PATENT DOCUMENTS

| | | |
|---|---|---|
| 60-160579 | 8/1985 | Japan. |
| 60-160580 | 8/1985 | Japan. |
| 60-262364 | 12/1985 | Japan. |

*Primary Examiner*—Bruce F. Bell
*Assistant Examiner*—Thomas H Parsons
*Attorney, Agent, or Firm*—Damian Porcari

[57] ABSTRACT

The present invention provides a method for initiating a fuel cell power system by directly introducing a gas containing oxygen into the fuel cell stack 10. A gas storage source 28 provides oxidizer to the fuel cell 10 such that there is enough initial power to generate a load. The air compressor 24 is started electrically by a portion of the load, and begins to supply compressed air to the cathode 14. The fuel cell stack 10 thereby obtains a further quantity of oxidizer from the compressed air. The air system valve 32 then operates to transfer the fuel cell stack 10 from the gas storage source 28 to the air compressor 24.

18 Claims, 1 Drawing Sheet

METHOD FOR INITIATING A FUEL CELL

BACKGROUND OF THE INVENTION

1. Field Of The Invention

The present invention relates to a power generation system using a fuel cell. More particularly the present invention relates to a method of initiating a fuel cell power system by introducing a stored gas containing oxygen into the fuel cell stack such that there is sufficient electrical power generated to start an air compressor.

2. Description Of The Related Art

Fuel cells are energy conversion devices which produce heat and direct current electrically from a chemical fuel and an oxidizer through a continuous electrochemical reaction. There are multiple types of fuel cells and a typical fuel cell stack is made of a number of cells wherein each cell has an anode, a cathode, and an electrolytic layer therebetween. The main difference between various fuel cell stacks is the type of electrolytic layer used. In Proton Exchange Member (PEM) fuel cells, fuel containing hydrogen is supplied to the fuel chamber at the anode and a gas containing oxygen is supplied to the air chamber at the cathode to generate electric power.

It is generally known that a primary difficulty associated with fuel cells is initiation of the electrochemical reaction within the stack. Various methods are currently used and each suffers the disadvantages of requiring a great amount of energy and or an unacceptably long time period prior to achieving full power continuous operation. A typical method currently used to initiate a fuel cell stack requires a separate stored power generating subsystem, such as a high voltage battery.

Currently, conventional vehicles contain a 12 volt battery subsystem to power electrical components and start an internal combustion engine. The use of a 12 volt battery subsystem would ideally be used to initiate the fuel cell stack in a fuel cell powered vehicle as it would be advantageous to provide a 12 volt subsystem to maintain the common usage of readily available electrical accessories. However, to increase overall system efficiency and to assure initiation, ancillary components of fuel cell systems are operated at a high voltage. Therefore, it is common for fuel cell battery storage systems and ancillary components to be operated in the 300 volt range. However, 12 volt systems are incapable of directly providing the requisite power output to initiate a fuel cell. Further, any DC voltage conversion proves to be inefficient and likely to quickly drain a 12 volt storage battery under difficult starting conditions.

It is therefore desirable to provide a method of fuel cell initiation in which auxiliary equipment and operation procedures necessary for initiation are simplified and expedited.

SUMMARY OF THE INVENTION

Responsive to the disadvantages of the prior art, the present invention provides a method and apparatus for initiating a fuel cell power system by introducing oxygen into the fuel cell stack such that there is sufficient electrical power generated by the fuel cell stack to start a high voltage device such as an air compressor without the necessity of an independent high voltage battery subsystem.

According to one embodiment of the present invention, a fuel cell power system is disclosed. The system provides a fuel cell stack for continuously generating electric power to a load having an anode, a cathode, and an electrolytic layer therebetween. Fuel containing hydrogen is supplied to the fuel chamber at the anode and a gas containing oxygen is supplied to the air chamber at the cathode to generate electrical power. To initiate operation of the fuel cell stack a gas storage source for supplying a gas containing oxygen to the cathode is provided. The oxygen provides enough oxidizer to the fuel cell such that there is sufficient electrical power to provide a load to start an air compressor. The air compressor is started electrically by a portion of the load and provides a continual supply of compressed air to the cathode. The fuel cell stack thereby obtains a sufficient quantity of oxidizer to generate power from compressed air. The air system valve then operates to shift the fuel cell stack from the stored gas containing oxygen to compressed air.

Another embodiment of the present invention provide for the fuel cell initiating gas storage subsystem. The gas being contained within an individual pressure vessel or a plurality of pressure vessels. The stored gas may be pure oxygen, oxygen-rich air, or plain air. Air is composed of approximately 21% oxygen and any increase in the oxygen content of the air provided to the fuel cell increases the initial electrical output.

A further embodiment of the present invention provides a self-contained oxygen subsystem which produces or regenerates a gas containing oxygen to thereby eliminate the necessity of external recharging. To provide such a system the air compressor is used to recharge the gas storage source. Further, a filter may be used to create oxygen-rich air from the compressed air produced by the air compressor. An example of such a filter is the perfluorocopolymer filter such as the type manufactured by Compact Membrane Systems of Delaware. An oxygen filter such as this has been found to provide oxygen-rich air composed of approximately 35% oxygen.

A still further embodiment of the present invention provides a motor controller to control the electric power supplied to operate the air compressor. Additionally, a system controller is available to monitor electric power produced by the fuel cell stack and determine the optimum time to start the air compressor and balance the mix of oxygen and compressed air. The system controller being integrated with a valve to optimally select between stored gas and compressed air.

Accordingly, an object of this invention is to provide a method of fuel cell initiation in which auxiliary equipment and operational procedures required for initiation are simplified and the necessity of an independent high voltage battery subsystem is eliminated. An advantage of the present invention is the use of an oxygen subsystem to directly initiate the fuel cell stack so as to provide enough power to initiate the air compressor.

A further object of the present invention is to provide a method of fuel cell initiation wherein the initiation time of the fuel cell stack is substantially decreased. An advantage of the present invention is the direct use of oxygen-rich air instead of air to provide an increased quantity of oxidizer to the fuel cell stack enabling a rapid advance to full power operation.

These and other desired objects and advantages of the present invention will become more apparent in the course of the following detailed description and appended claims. The invention may best be understood with reference to the accompanying drawing wherein an illustrative embodiment is shown.

DETAILED DESCRIPTION OF THE PREFERRED EMBODIMENTS

Figure 1:
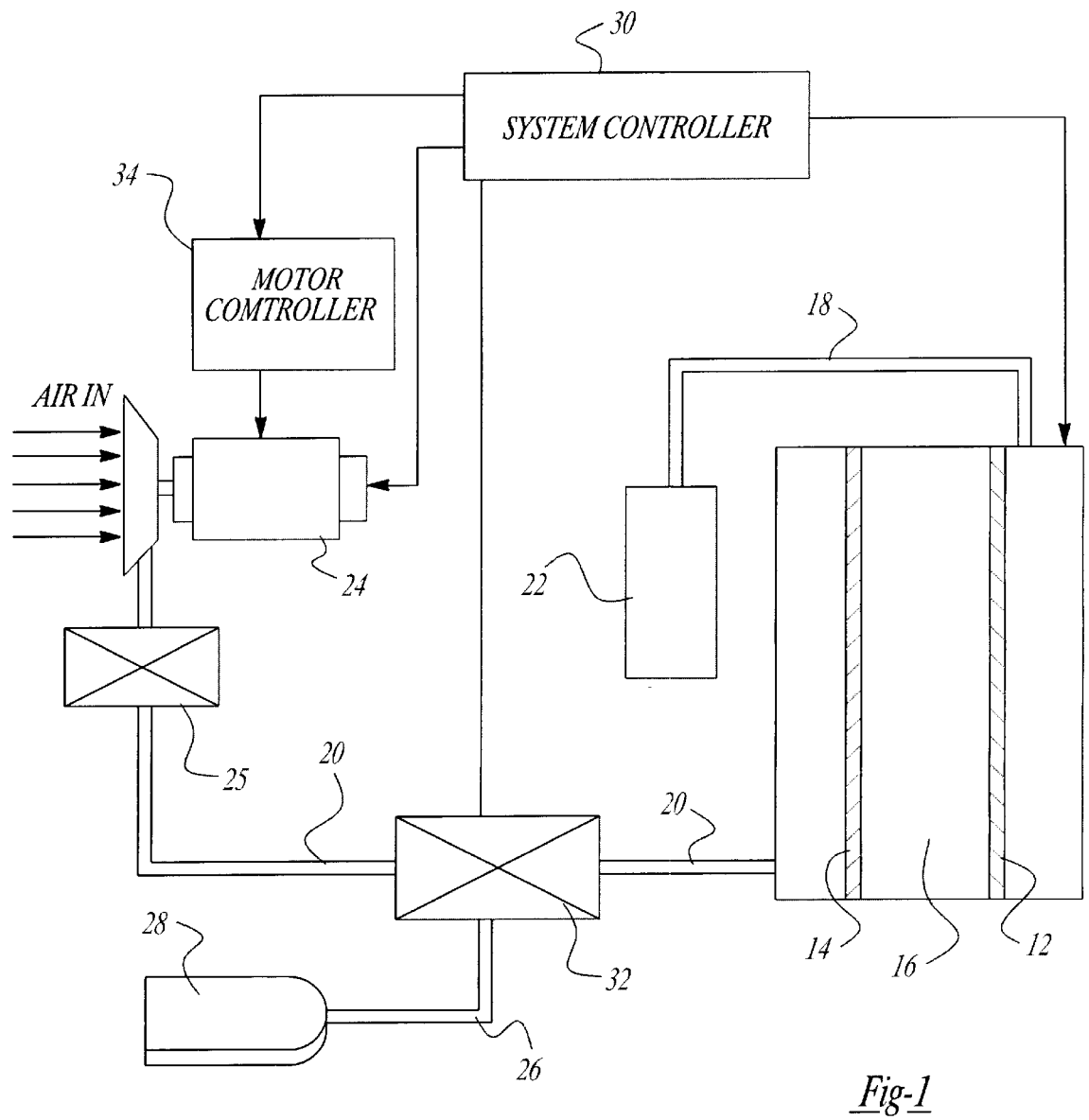
FIG. 1 is a simplified flow diagram outlining the structure of an exemplary embodiment of the present invention.

The present invention will be described through a drawing, which illustrates a method of fuel cell initiation. The following items are a word list of the items described in the drawing and are reproduced to aid in understanding the invention:

| | | |
|---|---|---|
| | 10 | fuel cell stack |
| | 12 | anode |
| | 14 | cathode |
| | 16 | electrolytic layer |
| | 18 | fuel supply system |
| | 20 | air supply system |
| | 22 | fuel storage tank |
| | 24 | air compressor |
| | 25 | filter |
| | 26 | air supply subsystem |
| | 28 | gas storage source |
| | 30 | system controller |
| | 32 | valve |
| | 34 | air compressor motor controller |

The present invention will be described through a drawing which illustrates a favorable method for initiating a fuel cell power system of the present invention. Referring to FIG. 1, there is shown a simplified flow diagram outlining the structure of a fuel cell power system. A fuel cell stack 10 for continuously generating electric power to a load, comprises an anode 12, a cathode 14, and an electrolytic layer 16 therebetween. The fuel cell stack 10 operates in a conventional manner wherein fuel containing hydrogen is supplied to the anode 12 and a gas containing oxygen is supplied to the cathode 14 to generate electric power. A fuel supply system 18 is connected to the fuel cell stack at the anode 12 and an air supply system 20 is connected to the fuel cell stack at the cathode 14.

The fuel supply system 18 primarily comprises a fuel storage tank 22 in which fuel such as hydrogen is stored and directly supplied to the anode 12. The fuel is converted into a hydrogen rich fuel gas and is supplied under pressure to the fuel cell stack 10 through the fuel supply system 18.

The air supply system 20 primarily includes an air compressor 24 which supplies compressed air to the fuel cell stack 10 through the air supply system 20. A filter 25 may be included in the air supply system 20 to create oxygen-rich air from the compressed air produced by the air compressor. An example of such a filter is a perfluorocopolymer filter such as the type manufactured by Compact Membrane Systems of Delaware. An oxygen filter such as this has been found to provide oxygen-rich air composed of approximately 35% oxygen. The compressed air is filtered by the filter 25 to oxygenate the compressed air prior to storage in the gas storage source 28. The present invention further includes an air supply subsystem 26 primarily comprising an independent gas storage source 28. The output of the air compressor 24 and gas storage source 28 are supplied through the air supply system 20 and the air supply subsystem 26 into the fuel cell stack 10 at the cathode 12 A system controller 30 and valve 32 operate to control the quantity and ratio of compressed air and stored gas being supplied to the fuel cell stack 10. A computer calculates the percentage of stored gas supplied to the fuel cell to sustain the threshold level electrical energy generated by the fuel cell stack.

The present invention provides for fuel cell stack initiation as follows. Upon an external signal, such as from a vehicle ignition (not shown), the system controller 30 causes the air system valve 32 to move from a closed position to an open position. The air system valve 32 opens to introduce a quantity of oxygen from the gas storage source 28 through the air supply system 20, directly into the cathode 14 section of the fuel cell stack 10 and the fuel supply system 18 provides fuel under pressure from the fuel storage tank 22 directly into the anode 12 section of the fuel cell stack 10. The direct introduction of oxygen to the cathode 14 provides an immediate source of oxidizer to the fuel cell stack 10. The fuel cell stack 10 responds to the supply of fuel and oxygen by producing an initial electrical output from the electrochemical reaction. The system controller 30 which monitors the electrical output from the fuel cell stack 10, senses the high voltage and directs the electrical output to the air compressor motor controller 34. The air compressor 24 is thereby started using this initial electrical output.

Operating electrically on the high voltage produced by the fuel cell stack 10, the air compressor 24 comes up to speed and produces compressed air. The compressed air is supplied through the air supply system 20 to the fuel cell stack 10. As the volume of compressed air increases the fuel cell stack 10 obtains a further source of oxidizer and obtains full power production capacity. The system controller 30 senses that the fuel cell stack 10 has obtained full power and closes the air system valve 32 to completely shut-off the gas storage source and thus switching fuel cell stack 10 operation to compressed air.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. A fuel cell power system comprising:
    a fuel cell stack for continuously generating electric power to a load, said fuel cell having an anode, a cathode, and an electrolytic layer therebetween, in which a fuel containing hydrogen is supplied to said anode and a gas containing oxygen is supplied to said cathode to generate said electric power;
    a gas storage source for supplying a stored gas to said cathode;
    a compressor started electrically by a portion of said load, said compressor supplying compressed air to said cathode and to said gas storage source; and
    a valve operable to select between said stored gas and said compressed air when said fuel cell stack is operable on oxygen supplied entirely from said air compressor.

2. A fuel cell power system according to claim 1, wherein said gas storage source contains pure oxygen.

3. A fuel cell power system according to claim 1, wherein said gas storage source contains oxygen rich air.

4. A fuel cell power system according to claim 1, wherein said gas storage source contains air.

5. A fuel cell power system according to claim 1, wherein said fuel cell stack is a proton exchange membrane.

6. A fuel cell power system according to claim 1, wherein said gas storage source is a pressure vessel.

7. A fuel cell power system according to claim 1, wherein said storage source is a plurality of pressure vessels.

8. A fuel cell power system according to claim 1, wherein said compressed air is filtered to oxygenate said compressed air prior to storage in said gas storage source.

9. A fuel cell power system according to claim 8, wherein said filter is a perfluorocopolymer.

10. A fuel cell power system according to claim 9, further comprising a motor controller to control said electric power provided to said air compressor.

11. A fuel cell power system according to claim 10, further comprising a system controller to monitor said electric power from said fuel cell stack and determines when said electric power is sufficient to start said air compressor.

12. A fuel cell power system according to claim 11, wherein said system controller monitors said electric power from said fuel cell stack and determines to shift from said gas storage source to said air compressor.

13. A fuel cell power system according to claim 12, wherein said valve is operable to supply any combination of from 0% to 100% stored gas from said gas storage source and from 0% to 100% of compressed air from said air compressor.

14. A method for starting a fuel cell power system, said method comprising the steps of:

supplying a fuel containing hydrogen to an anode of a fuel cell stack from a fuel source tank;

supplying a stored gas containing oxygen to a cathode of a fuel cell stack from a gas storage source;

said gas initiating said fuel cell and said fuel cell generating a level of electrical energy;

monitoring said level of electrical energy;

determining when said level of electrical energy exceeds a threshold level;

starting a compressor using said electrical energy when said threshold level is exceeded, and supplying compressed air from said air compressor to said fuel cell stack; and withdrawing said supply of stored gas when a system controller determines said fuel cell stack is operable on oxygen supplied entirely from said compressed air.

15. The method according to claim 14 further comprising said air compressor replenishing said gas storage source.

16. The method according to claim 15, further comprising filtering said compressed air to oxygenate said compressed air prior to storage in said gas storage source.

17. The method according to claim 16, wherein said system controller monitors the percentage of said stored gas and the percentage of said compressed air supplied to said fuel cell stack.

18. The method according to claim 17, further comprising a computer calculating the percentage of said stored gas supplied to said fuel cell to sustain said threshold level electrical energy generated by said fuel cell stack.

* * * * *